United States Patent Office 3,597,423
Patented Aug. 3, 1971

3,597,423
5-NITROFURYL-2-s-TRIAZOLO-[4,3-a]-
PYRIDINE DERIVATIVES
Fritz Wiedemann, Mannheim-Waldhof, Max Thiel, Mannheim, Kurt Stach, Mannheim-Waldhof, and Wolfgang Voemel, Mannheim, Germany, assignors to Boehringer Mannheim Gesellschaft mit beschrankter Haftung, Mannheim-Waldhof, Germany
No Drawing. Filed Aug. 8, 1967, Ser. No. 659,038
Claims priority, application Germany, Aug. 31, 1966, B 88,700, B 88,701, B 88,702; Apr. 20, 1967, B 92,146; Apr. 22, B 92,194
Int. Cl. C07d 31/42
U.S. Cl. 260—240
11 Claims

ABSTRACT OF THE DISCLOSURE

Novel compounds useful as chemo-therapeutic agents because of their outstanding effectiveness against a wide range of micro-organisms, such as, *Staphylococcus aureus*, *Escherichia coli*, *Proteus mirabilis*, *Pseudomonas aeruginosa* and *Streptococcus pyogenes* are disclosed. The compounds are 5 - nitrofuryl - 2-s-triazole-[4.3-a] pyridine derivatives having the following structural formula:

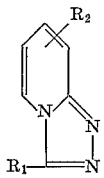

wherein $R_1$ and $R_2$ are each members selected from the group consisting of hydrogen, halogen, alkyl, alkoxy, nitro, amino, acylamino, carboxyalkyl, carboxamido, hydroxymethyl, O-acylated hydroxymethyl, O-alkylated hydroxymethyl and

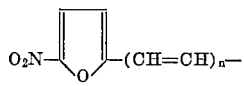

wherein $n$ is 0 or 1, with at least one of said $R_1$ and $R_2$ always being

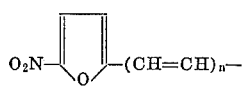

---

This invention relates to 5-nitrofuryl - 2 - s-triazolo-[4.3-a]-pyridine derivatives having antimicrobial activity and to methods for making and using the same.

More particularly, this invention relates to compounds having the following formula:

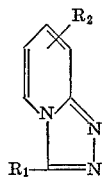

wherein $R_1$ and $R_2$ are each members selected from the group consisting of hydrogen, halogen, alkyl, alkoxy, nitro, amino, acylamino, carboxyalkyl, carboxamido, hydroxymethyl, O-acylated hydroxymethyl, O-alkylated hydroxymethyl, carboxyl and

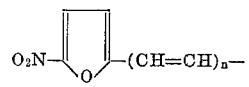

wherein $n$ is 0 or 1, with at least one of said $R_1$ and $R_2$ always being

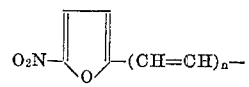

There are three groups of compounds which come within the scope of the above formula. These are the 3-(5-nitro-furyl-2-s-triazolo - [4.3-a] - pyridine derivatives (I); 3-[2 - (5-nitrofuryl-2) - vinyl]-s-triazole - [4,3-a]-pyridine derivatives (VI); and [2-(5-nitrofuryl-2)-vinyl]-s-triazolo-[4.3-a]-pyridine derivatives (XI).

The 3-(5-nitrofuryl - 2)-s-triazolo - [4.3-a]pyridine derivatives correspond to the following formula:

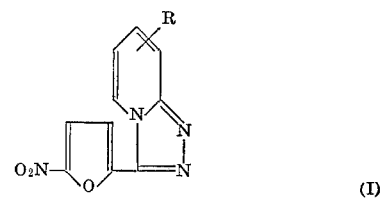

wherein R is hydrogen or halogen atom, alkyl, alkoxy, amido, acylamino, nitro, carboxyl, carboxalkyl or carboxyamido.

Said group of novel compounds of the invention and corresponding to Formula I are obtained by the conventional methods, as for example, by the dehydrogenation of a 5-nitro-furfural-pyridyl-(2) - hydrazone having the formula:

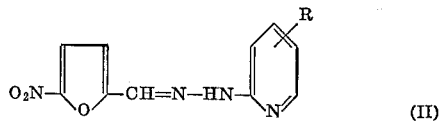

in which R has the same meaning as set out above; or by the dehydration of a 5-nitrofuroyl-(2)-pyridyl-(2)-hydrazide of the formula:

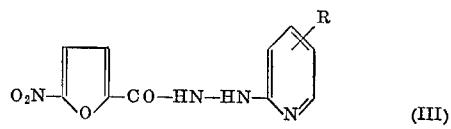

in which R has the same meaning as given above; or by the nitration of a 3-[furyl-(2)]-s-triazolo - [4.3-a]-pyridine derivative of the formula:

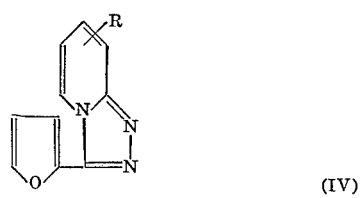

in which R has the same meaning as given above; or by heating an amidrazone of the formula:

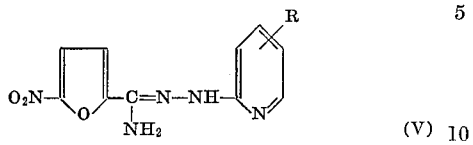

(V)

in which R has the same meaning as set out above; preferably in the presence of an agent for splitting off the elements of ammonia.

If desired, when R in the final product obtained is a carboxyl group, this can be converted, in the known manner, into a carboxyalkyl, carboxamide, amino or acylamino group and, this latter group then, if desired, can be saponified to give a free amino group.

The ring closure of the compounds (II) by dehydrogenation is preferably carried out by means of oxidation agents, such as for example, lead tetraacetate or red lead oxide in glacial acetic acid or benzene or ferric chloride in ethanol. In principle, however, other oxidation agents can also be used to the same effect.

The ring closure of the compounds (III) by dehydration is preferably carried out by heating with an agent which splits off the elements of water, such as for instance, phosphorus oxychloride, preferably in an inert solvent, such as benzene.

The nitration of the compounds (IV) is advantageously carried out in a solvent, such as acetic anhydride. When R is an amino group, then, under these conditions, it will be acetylated but, at the same time, this ensures that the amino group is protected from attack by the nitration agent. If desired, the acetyl group can thereafter be split off by saponification.

As agents for splitting off the elements of ammonia for the cyclization of the amidrazone (V), there have proved suitable acids, acid anhydrides and acid halides. However, the compounds (V) can be converted into the compounds (I) simply by heating in inert solvents of high boiling point.

The following conversion of the carboxyl group into a carboxyalkyl or carboxamide group can be carried out by any of the known esterification or amidation methods, for example, by reaction of the corresponding acid halide with a lower alcohol or ammonia. Furthermore, when R in the compounds (I) is a carboxyl group, the compounds can be subjected to a conventional acid decomposition via the corresponding isocyanates, for example, by the heating of the acid azides according to the Curtius reaction, the corresponding amino or acylamino compounds being obtained, depending upon the nature of the solvent used, i.e., inert solvents, acids or acyl anhydrides.

The compounds (II) used as starting materials can be prepared by the condensation of 5-nitrofurfural with a 2-hydrozino-pyridine. The compounds (III) can be obtained by the reaction of 5-nitro-furoyl chloride with a 2-hydrazino-pyridine, preferably in an inert solvent, such as benzene and at an elevated temperature.

The 3 - [2 - (5-nitrofuryl-2)-vinyl]-s-triazolo-[4.3-a]-pyridine derivatives correspond to the following formula:

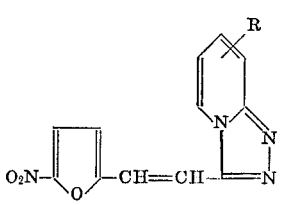

(VI)

wherein R is a hydrogen or halogen atom, alkyl, alkoxy, nitro, amino, lower acylamino, carboxyl, carboxalkyl or carboxamido.

The compounds of the invention corresponding to structural Formula VI above set out can be prepared in the known manner by the dehydrogenation of a furyl-(2)-acrolein-pyridyl-(2)-hydrazone having the formula:

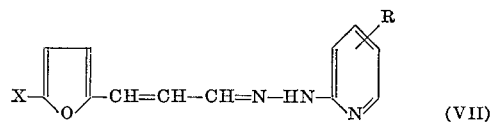

(VII)

wherein R has the same significance as given above and X is a hydrogen atom or a nitro group; or by the dehydration of a furyl-(2)-acrylic acid-pyridyl-(2)-hydrazide of the formula:

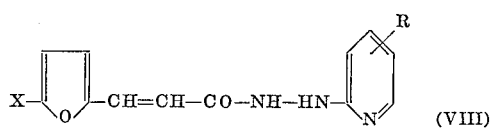

(VIII)

wherein R and X have the same significance as given above; or by the condensation of an s-triazolo-[4.3-a]-pyridine having the formula:

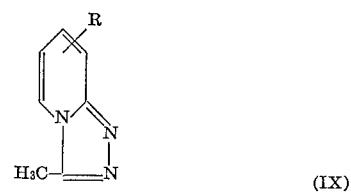

(IX)

wherein R has the same meaning as set out above, with a furan of the formula:

(X)

wherein X has the same meaning as given above; or with a reactive derivative of the furan (X). In the case in which X represents a hydrogen atom, the products obtained are subsequently nitrated in the known manner and, in the case in which R represents an amino group, the products obtained are, if desired, subsequently saponified.

The ring closure of the compounds (VII) by dehydrogenation preferably takes place by means of oxidation agents, such as lead tetraacetate or red lead oxide in glacial acetic acid or benzene, or ferric chloride in ethanol. However, in principle, any other suitable oxidation agents can also be used.

The ring closure of the compounds (VIII) by dehydration preferably takes place by heating in the presence of an agent splitting off the elements of water, such as for example, phosphorus oxychloride and preferably in the presence of an inert solvent, such as benzene.

The condensation of the compounds (IX) with the furans (X) can be carried out by heating the two reaction components in a solvent, such as acetic anhydride. In the case in which R represents an amino group, the compound is acetylated under the aforesaid reaction conditions but, at the same time, it is protected from attack by the carbonyl group of the furans (X). If desired, the acetyl group can thereafter be split off by saponification.

When X in the furans (X) is a hydrogen atom, then the subsequent nitration preferably takes place in acetic anhydride so that, when R is an amino group, what has been stated above again applies.

As reactive derivatives of the furans (X), it is particularly preferred to use the corresponding diacetates which, under the conditions of the condensation reaction, behave in the same manner as the free aldehydes but have the advantage of being more stable under storage conditions.

The compounds (VII) used as starting materials can be prepared by the condensation of a furyl-(2)-acrolein with a 2-hydrazino-pyridine.

The compounds (VIII) used as starting materials can be prepared by the reaction of a furyl-(2)-acrylic acid chloride with a 2-hydrazino-pyridine, preferably in an inert solvent, such as for instance, benzene, at an elevated temperature.

The novel [2-(5-nitrofuryl-2)-vinyl]-s-triazolo[4.3-a]-pyridine derivatives according to the present invention are compounds having the structural formula:

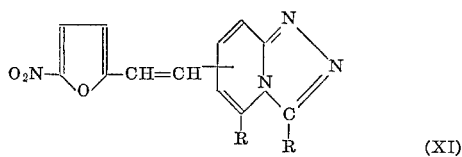
(XI)

wherein R is a hydrogen atom or lower alkyl, amino, acylamino or hydroxymethyl which may be O-acylated or O-alkylated.

The compounds according to the present invention which correspond to Formula XI can be prepared in the conventional manner, by the condensation of a s-triazolo-[4.3-a]-pyridine of the formula:

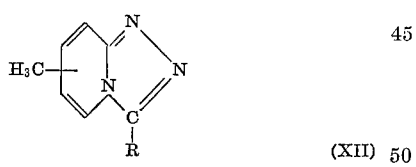
(XII)

in which R has the same significance as given above, with a furan of the formula:

(XIII)

in which X is a hydrogen atom or a nitro group, or with a reactive derivative thereof. Thereafter, when X is a hydrogen atom, the product obtained is nitrated in the known manner and when R is to be an amino group, the product is, if desired, thereafter saponified. When R is a hydroxymethyl group, it is if desired, subsequently esterified or etherified or when R is an O-acylated or O-alkylated hydroxymethyl group, it is, if desired, subsequently saponified.

The condensation of the compounds (XII) with the furans (XIII) is carried out by heating the two reaction components in a solvent, such as acetic anhydride. When R in the compound (XII) is an amino group, then, under these conditions, it will be acetylated and, at the same time, protected from attack by the carbonyl group in the furans (XIII). If desired, the acetyl group can thereafter be removed by saponification.

When X in the furans (XIII) represents a hydrogen atom, then the subsequent nitration preferably takes place in acetic anhydride, the above-mentioned acetylation thereby again taking place when R is an amino group.

As reactive derivatives of the furans (XIII), it is particularly preferred to use the diacetates which, during the condensation reaction, behave in the same way as the free aldehydes but have the advantage of being more stable on storage.

For the subsequent introduction or splitting off of O-alkyl or O-acyl groups from the hydroxymethyl radicals, there can be used any of the known esterification methods, as for instance, reaction with an acid halide or an acid anhydride, any of the known etherification methods, for instance, reaction with a diazo-alkane, possibly in the presence of an acidifying catalyst or the conventional saponification methods as for example, treatment with a mineral acid.

The following examples serve to illustrate the present invention, without however, limiting the same thereto.

EXAMPLE 1

3-[5-nitro-furyl-(2)]-s-triazolo-[4.3-a]-pyridine

Variant A.—9.28 g. 5-nitro-furfurol-pyridyl-(2)-hydrazone in 800 ml. glacial acetic acid were mixed, while stirring, with 18.0 g. lead tetraacetate. The reaction mixture was further stirred for 1 hour at 55° C. and then evaporated to dryness in a vacuum. The residue was taken up in water, filtered with suction and thereafter washed. There were obtained 9.0 g. (97% of theory) 3-[5-nitro-furyl-(2)]-s-triazole-[4.3-a]-pyridine having a melting point of 266–270° C. Following recrystallization from dioxan, there were obtained 4.98 g. of product having a melting point of 275–277° C.

The compounds as set out in the following Table I were obtained in an analogous manner:

TABLE I

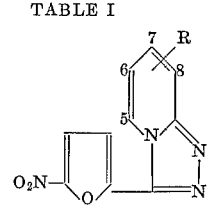

| R | M.P., ° C. | Yield (percent of theory) |
|---|---|---|
| 6-CH₃ | 233 | 65 |
| 7-CH₃ | >300 | 43 |
| 8-CH₃ | 248 | 80 |
| 5-Cl | 186–189 | 93 |
| 6-NO₂ | 294 | 85 |
| 8-NO₂ | 267 | 95 |
| 6-COOH | >300 | 77 |

The hydrazones used as starting materials, i.e., compounds (II), were prepared in the following manner:

23.4 g. 5-nitro-furfural in 200 ml. ethanol were added to a solution of 16.3 g. 2-hydrazino-pyridine in 200 ml. ethanol. The reaction product precipitated out immediately. There were obtained 23.0 g. (67% of theory) 5-nitrofurfurol-pyridyl-(2)-hydrazone having a melting point of 209–211° C. (decomp.). Following recrystallization from dioxan, the compound melted at 211–212° C. (decomp.).

The starting materials which are set out in the following Table II were obtained in an analogous manner:

TABLE II

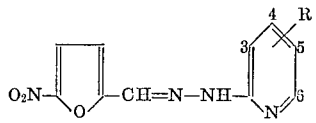

| R | M.P. | Yield (percent of theory) |
| --- | --- | --- |
| 5-CH₃ | 108° C. (decomp.) | 53 |
| 4-CH₃ | 216° C. (decomp.) | 77 |
| 3-CH₃ | 192° C. (decomp.) | 75 |
| 6-Cl | 232° C. | 61 |
| 5-NO₂ | 227° C.¹ | 83 |
| 3-NO₂ | 248° C. (decomp.) | 85 |
| 5-COOH | Above 290° C. (decomp.)² | 84 |

¹ Crystallizes from dimethyl formamide with 1 mol of dimethyl formamide.
² Prepared in dilute acetic acid.

Variant B.—1.16 g. 5-nitro-furfurol-pyridyl-(2)-hydrazone were heated under reflux for 2 hours with 2.7 g. ferric chloride hexahydrate in 100 ml. ethanol. The reaction mixture was evaporated to dryness in a vacuum and the residue mixed with water. After filtering with suction, the product which was obtained was recrystallized from dioxan. There were obtained 0.26 g. (23% of theory) 3-[5-nitro-furyl-(2)]-s-triazolo - [4.3-a]-pyridine having a melting point of 274° C.

Variant C.—1.0 g. 5-nitro-furoyl-(2)-pyridyl-(2) - hydrazide was boiled under reflux for 2.5 hours with 10 ml. phosphorus oxychloride. After distilling off the excess phosphorus oxychloride in a vacuum, the remaining material was converted into the base form with a solution of sodium bicarbonate. By recrystallization from dimethyl formamide, there was obtained 0.1 g. (11% of theory) 3-[5-nitro-furyl-(2)]-s-triazolo - [4.3-a] - pyridine having a melting point of 275° C.

The 5-nitro-furoyl-(2)-pyridyl-(2)-hydrazide employed as starting material was prepared in the following manner:

17.5 g. 5-nitro-furoyl chloride dissolved in 50 ml. dry pyridine were introduced, with stirring, at ambient temperature into a solution of 10.9 g. 2-hydrazino-pyridine in 30 ml. dry pyridine. The reaction mixture was heated to 100° C. and stirred for a further 15 minutes at this temperature. The solvent was then removed in a vacuum and the residue neutralized with a solution of sodium bicarbonate. After filtering off the product with suction, it was liberally washed with water. The desired hydrazide was obtained in the form of brown crystals which melted at 210° C., with decomposition.

Variant D.—1.0 g. 5-nitro-furoyl-(2)-pyridyl-(2) - hydrazide was heated under reflux for 3 hours with 6 ml. acetic anhydride. The solvent was removed in a vacuum and the residue triturated with ether. There were thereby obtained 0.86 g. (94% of theory) crude 3-[5-nitro-furyl-(2)]-s-triazolo-[4.3-a]-pyridine having a melting point of 271° C. For the purposes of analysis, the compound was recrystallized from dioxan.

Variant E.—A mixture of 20 ml. acetic anhydride, 2.0 ml. fuming nitric acid and 1 drop of concentrated sulfuric acid was slowly introduced at −25° C. into a solution of 3.7 g. 3-furyl-(2)-s-triazolo-[4.3-a]-pyridine in 20 ml. acetic anhydride. The reaction mixture was then further stirred for 1 hour at −25° C. and thereafter poured on to ice. After decomposition of the acetic anhydride, the mixture was neutralized with 2 N sodium hydroxide solution, the product filtered off with suction and then washed with water. There were obtained 0.7 g. (15% of theory) 3 - [5-nitro-furyl-(2)]-s-triazolo-[4.3-a]-pyridine having a melting point of 274° C. For analysis, the compound was recrystallized from dioxan.

Variant F.—14.1 g. pyridyl-(2)-nitro-furamidrazone hydrochloride were heated to the boil with 176 ml. acetic anhydride. After cooling, the product obtained was filtered off with suction and washed with acetic anhydride and ether. There were recovered 6.0 g. (52% of theory) 3-[5-nitro-furyl-(2)]-s-triazolo - [4.3-a]-pyridine in the form of yellow crystals having a melting point of 276° C.

The same product was obtained by boiling this amidrazone or its hydrochloride in 2 N hydrochloric acid, 50% acetic acid, acetic anhydride or nitrobenzene. The hydrochloride of pyridyl-(2)-nitro-furamidrazone used as starting material was prepared in the following manner:

A solution of 10.9 g. 2-hydrazino-pyridine in 50 ml. methanol was added to a suspension of 22.0 g. nitro-furan-iminocarboxylic acid ethyl ester hydrochloride in 100 ml. methanol. The reaction mixture was permitted to stand at ambient temperature for 3 hours, the product thereafter filtered off with suction, and washed with methanol to give 27.7 g. (98% of theory) of the desired amidrazone in the form of red crystals having a melting point of 231–232° C. (decomp.).

EXAMPLE 2

3-[5-nitro-furyl-(2)]-6-methoxycarbonyl-s-triazolo-[4.3-a]-pyridine 13.5 g. 3-[5-nitro-furyl-(2)]-6-carboxy-s-triazolo-[4.3-a]-pyridine were heated under reflux for 8 hours with 150 ml. thionyl chloride. The reaction mixture was evaporated to dryness in a vacuum, the residue suspended in benzene and then mixed with 100 ml. methanol. This mixture was stirred for 1 hour at 55° C., cooled, filtered with suction, the residue neutralized with a solution of sodium acetate and then washed, first liberally with water and thereafter washed with methanol. There were obtained 8.8 g. (61% of theory) 3-[5-nitro-furyl-(2)]-6-methoxycarbonyl-s-triazolo-[4.3-a]-pyridine in the form of yellow crystals which melted at 208–209° C.

EXAMPLE 3

3-[5-nitro-furyl-(2)]-s-triazolo-[4.3-a]-pyridine-6-carboxylic acid amide 13.5 g. 3-[5-nitro-furyl-(2)]-s-triazolo-[4.3-a]-pyridine-6-carboxylic acid were converted into the acid chloride with thionyl chloride following the procedure described in Example 2 and then suspended in anhydrous ether. Gaseous ammonia was then introduced whereby the desired amide was obtained in a yield of 12.8 g. (94% of theory) in the form of greenish-yellow crystals which melted at 285° C. (decomp.).

EXAMPLE 4

6-amino-3-[5-nitro-furyl (2)-]-s-triazolo-[4.3-a]-pyridine 2.7 g. 3-[5-nitro-furyl-(2)]-s-triazolo-[4.3-a]-pyridine-6-carboxylic acid were converted into the acid chloride according to the method described in Example 2. The residue remaining after evaporation of the thionyl chloride used for the chlorination was suspended in 100 ml. acetone. A solution of 0.68 g. sodium azide in 1.7 ml. water was added to the suspension with stirring. The precipitate formed which thereby consisted of strongly contaminated acid azide, was filtered off with suction. The filtrate was mixed with water and there were obtained 1.7 g. (57% of theory) 3-[5-nitro-furyl-(2)]-s-triazolo-[4.3-a]-pyridine-6-carboxylic acid azide in the form of yellow crystals which melted at 140–145° C. (decomp.). 1.5 g. of this azide were heated in a mixture of dioxan and water (2:1) until the evolution of nitrogen was completed. The reaction mixture was evaporated to dryness in a vacuum, the residue extracted with a solution of sodium bicarbonate, dissolved in 2 N hydrochloric acid and precipitated again by neutralization. There were obtained 0.12 g. (10% of theory) 6-amino-3-[5-nitro-furyl-(2)]-s-triazolo-[4.3-a]-pyridine in the form of red crystals which darken at 270° C. and beyond 280° C., became black, without melting.

In an analogous manner, by heating the carboxylic acid azide in acetic anhydride, there was obtained 6-acetamino - 3 - [5-nitro-furyl-(2)]-s-triazolo-[4.3-a]-pyridine in the form of greenish-yellow crystals which became brown-colored at 270° C., and decomposed at 310° C.

EXAMPLE 5

5-methyl-3-[5-nitro-furyl-(2)]-s-triazolo-[4.3-a]-pyridine 14.8 g. 5-nitrofuroyl-(2)-6-methyl-pyridyl-(2)-hydrazide were heated under reflux for 4 hours with 90 ml. phosphorus oxychloride. After removal of the excess phosphorus oxychloride in a vacuum, the remaining material was converted into the base with a solution of sodium bicarbonate. By recrystallization from glacial acetic acid, followed by dissolution in 2 N hydrochloric acid and reprecipitation with a solution of sodium bicarbonate, there were obtained 1.1 g. 5-methyl-3-[5-nitro-furyl-(2)]-s-triazolo-[4.3-a]-pyridine in the form of yellow crystals having a melting point of 170–172° C.

The 5-nitrofuroyl-(2)-6-methyl-pyridyl - (2)-hydrazide used as starting material was prepared in the following manner:

A solution of 17.6 g. nitrofuroyl chloride in benzene was added in dropwise fashion to a solution of 12.3 g. 2-hydrazino-6-methyl-pyridine in benzene. The reaction mixture was stirred for 3 hours at ambient temperature, filtered with suction, thereafter washed with benzene and the residue neutralized with a solution of sodium acetate. There were thusly obtained 23.5 g. (90% of theory) 5-nitro-furoyl-(2)-6-methyl-pyridyl-(2)-hydrazide having a melting point of 235–237° C.

EXAMPLE 6

5-carboxy-3-[5-nitro-furyl-(2)]-s-triazolo-[4.3-a]-pyridine 2.76 g. nitrofurfurol-6-carboxy-pyridyl-(2)-hydrazone (M.P. 245–246° C.) were dissolved in 30 ml. glacial acetic acid and mixed, while stirring, with 4.59 g. lead tetraacetate. The reaction mixture was stirred for 1 hour at ambient temperature and then for 3 hours at 55° C. After cooling, the reaction mixture was filtered with suction and the residue washed with glacial acetic acid and ether. There were obtained 1.4 g. (51% of theory) 5-carboxy-3-[5-nitro-furyl-(2)]-s-triazolo-[4.3-a]-pyridine in the form of yellow crystals having a melting point of >300° C.

In an analogous manner, there was obtained from nitrofurfurol-4-carboxy-pyridyl-(2)-hydrazone (M.P. 275° C.), in 46% yield, 7-carboxy-3-[5-nitro-furyl-(2)]-s-triazolo-[4.3-a]-pyridine in the form of yellow crystals having a melting point of >300° C.

The hydrazones used as starting materials were obtained by the reaction of 5-nitro-furfural with 2-hydrazino-pyridine-6-carboxylic acid and 2-hydrazino-pyridine-4-carboxylic acid, respectively, in 50% acetic acid at ambient temperature.

EXAMPLE 7

3-[2-(5-nitrofuryl-2)-vinyl]-s-triazolo-[4.3-a]-pyridine

Variant A.—1.3 g. 5-nitrofuryl-acrolein-pyridyl-(2)-hydrazone were heated under reflux for 2 hours with 2.7 g. ferric chloride hexahydrate in 100 ml. methanol. The solvent was then removed in a vacuum, the residue triturated with water and filtered with suction. After recrystallization from dimethyl formamide, under use of activated charcoal, there were obtained 0.28 g. 3-[2-(5-nitrofuryl-2) - vinyl] - s - triazolo-[4.3-a]-pyridine (22% of theory), which had a melting point of 298° C. (decomp.).

Variant B.—11.0 g. 5-nitrofuryl-acrylic acid-pyridyl-(2)-hydrazide were heated under reflux for 1.5 hours with 110 ml. phosphorus oxychloride. Excess phosphorus oxychloride was then removed in a vacuum. The resulting residue was mixed with ice water and neutralized with a solution of sodium bicarbonate. The substance so obtained was recrystallized from dimethyl formamide providing 4.82 g. 3-[2-(5-nitro-furyl-2)-vinyl]-s-triazolo-[4.3-a]-pyridine (49% of theory), which had a melting point of 299° C. (decomp.).

Variant C.—1.33 g. of 3-methyl-s-triazolo-[4.3-a]-pyridine were heated under reflux for 3 hours with 1.55 g. 5-nitro-furfural in 5 ml. acetic anhydride. The solvent was then removed in a vacuum, the residue taken up in ether and filtered with suction. Following recrystallization from acetic anhydride, with the use of activated charcoal, there were obtained 0.14 g. 3-[2-(5-nitrofuryl-2)-vinyl]-s-triazolo-[4.3-a]-pyridine (5.5% of theory), which had a melting point of 299° C. (decomp.).

The 5-nitrofuryl-acrolein-pyridyl-(2)-hydrazone used as starting material in variant A was prepared by the following method:

A solution of 8.3 g. 5-nitrofuryl-acrolein in 200 ml. methanol was added to a solution of 5.45 g. 2-hydrazino-pyridine in 100 ml. methanol to which a few drops of concentrated hydrochloric acid had been previousl added. The reaction mixture was allowed to stand overnight, the product thereby formed was filtered off with suction and then washed with methanol and ether. There were thusly obtained 12.4 g. 96% of theory) 5-nitrofuryl-acrolein-pyridyl-(2)-hydrazone, which had a melting point of 240–243° C. (decomp.). After recrystallization from dioxan, the product melted at 241–243° C. (decomp.).

The 5-nitrofuryl-(2)-acrylic acid-pyridyl (2)-hydrazide used as starting material in variant B was prepared in the following manner:

2.01 g. 5-nitrofuryl-acrylic acid chloride was dissolved in 15 ml. dry benzene and the solution then introduced, with stirring, into a solution of 1.09 g. 2-hydrazino-pyridine in benzene. The reaction product was filtered off with suction, then washed with benzene and converted into the base by means of a solution of sodium bicarbonate. After recrystallization from isopropanol, there were obtained 1.22 g. 5-nitrofuryl-(2)-acrylic acid-pyridyl-(2)-hydrazide (45% of theory), which had a melting point of 177–179° C.

EXAMPLE 8

5-chloro-3-[2-(5-nitrofuryl-2)-vinyl]-s-triazolo-[4.3-a]-pyridine 20.1 g. lead tetraacetate were added portionwise with stirring, to 11.6 g. 5-nitrofuryl-acrolein-6-chloro-pyridyl-(2)-hydrazone in 200 ml. glacial acetic acid. After 30 minutes, the reaction mixture was heated to 55° C. and further stirred at this temperature for 2 hours. The product which crystallized out upon cooling, was filtered off with suction, then washed with glacial acetic acid and thereafter with water and finally dried. There were obtained 9.2 g. (80% of theory) 5-chloro-3-[2-(5-nitrofuryl-2)-vinyl]-s-triazolo-[4.3-a]-pyridine, which had a melting point of 271–273° C. (decomp.).

The compounds set out in the following Table III were prepared in a nanalogous manner:

TABLE III $$O_2N-\langle O \rangle-CH=CH-\underset{\underset{5}{\overset{N}{\mid}}}{\overset{6}{\underset{\mid}{\bigg|}}}\overset{7\ R}{\underset{\underset{N}{\mid}}{\overset{8}{\bigg|}}}$$

| R | M.P., °C. | Yield (percent of theory) |
|---|---|---|
| 5-CH₃ | *250 | 33 |
| 6-CH₃ | 243 | 48 |
| 7-CH₃ | >300 | 20 |
| 8-CH₃ | *253 | 86 |
| 6-NO₂ | 253 | 71 |
| 8-NO₂ | >300 | 94 |
| 6-COOH | >300 | 76 |

*Decomposition.

The hydrazones (VII) used as starting material was prepared by the procedure described in Example 7 and are set out in the following Table IV:

TABLE IV $$O_2N-\langle O \rangle-CH=CH-CH=N-NH-\overset{4\ R}{\underset{\underset{N}{\mid}}{\bigg|}}$$

| R | M.P. | Yield (percent of theory) |
|---|---|---|
| 6-CH₃ | 189–190° C | 74 |
| 5-CH₃ | 218° C. (decomp.) | 76 |
| 4-CH₃ | 219–220° C | 92 |
| 3-CH₃ | 168° C. (decomp.) | 62 |
| 6-Cl | 221° C. (decomp.) | 89 |
| 5-NO₂ | 225° C. (decomp.) | 89 |
| 3-NO₂ | 248° C. (decomp.) | 94 |
| 5-COOH | From 260° C. (decomp.) | *90 |

*Reaction in glacial acetic acid.

EXAMPLE 9

3-acetamido-7-[2-(5-nitrofuryl-2)vinyl]-s-triazolo-[4.3-a]pyridine 1.48 g. 3 - amino - 7 - methyl - s - triazolo - [4.3 - a]-pyridine were heated under reflux for 30 minutes with 12 ml. acetic anhydride. 1.52 g. 5-nitro-furfural were added thereto and the refluxing continued for 3 hours. The reaction mixture was allowed to stand overnight, the 3 - acetamido - 7 - [2 - (5 - nitro - furyl - 2) - vinyl]-s - triazolo - [4.3 - a] - pyridine thereby crystallizing out. The yield of recovered compound amounted to 2.4 g. (77% of theory) and melted at >300° C. For analysis, it was recrystallized from dimethyl formamide.

*Analysis.*—Calc. (percent): C, 53.67; H, 3.54; N, 22.36. Found (percent): C, 53.32%; H, 4.23; N, 21.43.

EXAMPLE 10

3-amino-7-[2-(5-nitrofuryl-2)-vinyl]-s-triazolo-[4.3-a]-pyridine 2 g. 3-acetamido-7-[2-(5-nitrofuryl-2)vinyl]-s-triazolo-[4.3-a]-pyridine, prepared by the procedure described in Example 9, were heated under reflux for 3 hours in 20 ml. of a mixture of glacial acetic acid and concentrated hydrochloric acid. The resulting reaction mixture was then evaporated to dryness and the residue neutralized with sodium acetate. Following filtration with suction, the product was recrystallized from dimethyl formamide. There were thusly obtained 1.25 g. (76% of theory) 3-amino - 7 - [2 - (5 - nitrofuryl - 2) - vinyl - s - triazolo-[4.3-a]-pyridine which had a melting point of >300° C.

*Analysis.*—Calc. (percent): C, 53.14; H, 3.35; N, 25.83. Found (percent): C, 53.02; H, 3.67; N, 24.70.

EXAMPLE 11

3-methyl-5-[2-(5-nitrofuryl-2)-vinyl]-s-triazolo-[4.3-a]-pyridine

A mixture of 9.4 g., 3,5-dimethyl-s-triazolo-[4.3-a]-pyridine, 9.9 g. nitro-furfural and 33 ml. acetic anhydride was heated, with stirring, for 5 hours at 110° C. The reaction mixture was then cooled and ether added thereto resulting in the precipitation of 15.2 g. of crude product. Following the addition of activated charcoal, the product was recrystallized from acetic anhydride and dimethyl formamide. There were obtained 3.5 g. (21% of theory) 3 - methyl - 5 - [2 - (5 - nitrofuryl - 2) - vinyl] - s - triazolo-[4.3-a]-pyridine, which had a melting point of 224° C. (decomp.).

In an analogous manner, there was obtained from 3,7-dimethyl-s-triazolo-[4.3-a]-pyridine, in a 51% yield, 3-methyl - 7 - [2 - (5 - nitrofuryl - 2) - vinyl] - s - triazolo-[4.3-a]-pyridine, which had a melting point of 259° C. (decomp.), and starting from 3-ethyl-7-metyhl-s-triazolo-[4.3-a]-pyridine, in a 47% yield, 3-ethyl-7-[2-(5-nitrofuryl-2)-vinyl]-s-triazolo-[4.3-a]-pyridine, which had a melting point of 237° C.

EXAMPLE 12

3-acetoxymethyl-7-[2-(5-nitrofuryl-2)-vinyl]-s-triazolo-[4.3-a]-pyridine 7.5 g. 3 - hydroxymethyl - 7 - methyl - s - triazolo-[4.3-a]-pyridine were heated for 15 minutes at 110° C. with 75 ml. acetic anhydride. 7.2 g. 5-nitro-furfural were added thereto and the reaciton mixture stirred for 3 hours at this temperature. Following cooling, the crystals which separated out were filtered off with suction and washed with acetic anhydride and ether. These were obtained 10.1 g. (67% of theory) 3-acetoxymethyl-7-[2-(5-nitrofuryl-2)-vinyl]-s-triazolo-[4.3-a]-pyridine in the form of yellow crystals which melted at 238° C.

The 3 - hydroxymethyl-7-methyl-s-triazole-[4.3-a]-pyridine used as starting material was prepared by the following method:

10.4 g. ethyl glycolate and 12.3 g. 2-hydrazino-4-methyl-pyridine were admixed and slowly heated to 160° C. and then maintained at this temperature for 8 hours. After cooling, the reaction mixture was triturated with ether, filtered with suction and recrystallized from dioxan. There were thusly obtained 8.7 g. (53.5% of theory) 3-hydroxymethyl - 7 - methyl - s - triazolo - [4.3 - a] - pyridine, which had a melting point of 156–158° C.

EXAMPLE 13

3-hydroxymethyl-7-[2-(5-nitrofuryl-2)-vinyl]-s-triazolo-[4.3-a]-pyridine 5.0 g. 3-acetoxymethyl - 7 - [2-(5-nitrofuryl-2)-vinyl]-s-triazolo-[4.3-a]-pyridine were heated under reflux for 1 hour in 50 ml. 2 N hydrochloric acid. After cooling, the reaction mixture was filtered using suction and the residue obtained washed with water. The residue was then boiled with water, filtered off with suction while still hot and thereafter washed with hot water. There were thusly obtained 3.4 g. (78% of theory) 3 - hydroxymethyl-7-[2 - (5 - nitrofuryl - 2)-vinyl]-s-triazolo-[4.3-a]-pyridine in the form of yellow crystals which melted at 285° C. (decomp.). After recrystallization from dimethyl formamide, the product melted at 286–287° C. (decomp.).

EXAMPLE 14

3-methoxymethyl-7-[2-(5-nitrofuryl-2)-vinyl]-s-triazolo-[4.3-a]-pyridine

A mixture of 17.7 g. 3 - methoxymethyl - 7 - methyl-s-triazolo-[4.3-a]-pyridine, 15.5 g. nitro-furfural and 102 g. acetic anhydride was heated, while stirring, at 110° C. for 2.75 hours. After cooling, the reaction mixture was filtered with suction and then successively washed with glacial acetic acid and ether. There were obtained 21.6 g. (72% of theory) 3-methoxymethyl - 7 - [2-(5-nitrofuryl - 2)-vinyl]-s-triazolo-[4.3-a]-pyridine in the form of yellow crystals which took on a brown coloration at a temperature above 250° C. and decomposed at 282° C.

The 3 - methoxymethyl - 7 - methyl-s-triazolo-[4.3-a]-pyridine used as starting material was prepared in the following manner:

28.5 g. 2 - hydrazino - 4 - methyl-pyridine were heated to the boil with 36.1 g. methoxy acetic acid methyl ester and the methanol and water thereby formed collected in a trap. The resulting reaction mixture was evaporated to dryness in a vacuum and the residue triturated with ether. There were obtained 35.1 g. (85% of theory) 3-methoxymethyl - 7 - methyl-s-triazolo-[4.3-a]-pyridine in the form of colorless crystals which following recrystallization from benzene-ligroin, melted at 97° C.

The antimicrobial activity of the compounds in accordance with the invention was evaluated in vitro with respect to the following organisms:

*Staphylococcus aureus:* SG 511 (12)
*Streptococcus pyogenes:* Aronson (75)
*Streptococcus faecalis:* (155)
*Escherichia coli:* (18)
*Proteus mirabilis:* (298), and
*Pseudomonas aeruginosa:* (71)

The following compounds were employed in the evaluation:

(A) 3-[5-nitro-furyl-(2)]-s-triazolo-[4.3-a]-pyridine
(B) 8-nitro-3-[5-nitro-furyl-(2)]-s-triazolo-[4.3-a]-pyridine
(C) 6-nitro-3-[5-nitro-furyl-(2)]-s-triazolo-[4.3-a]-pyridine
(D) 8-methyl-3-[5-nitro-furyl-(2)]-s-triazolo-[4.3-a]-pyridine
(E) 6-methyl-3-[5-nitro-furyl-(2)]-s-triazolo-[4.3-a]-pyridine
(F) 3-[5-nitro-furyl-(2)]-s-triazolo-[4.3-a]-pyridine-6-carboxylic acid amide
(G) 3-[5-nitro-furyl-(2)]-6-methoxycarbonyl-s-triazolo-[4.3-a]-pyridine
(H) 6-amino-3-[5-nitro-furyl-(2)]-s-triazolo-[4.3-a]-pyridine
(I) 6-acetamino-3-[5-nitro-furyl-(2)]-s-triazolo-[4.3-a]-pyridine
(J) 3-[2-(5-nitrofuryl-2)-vinyl]-s-triazolo-[4.3-a]-pyridine
(K) 8-methyl-3[2-(5-nitrofuryl-2)-vinyl]-s-triazolo-[4.3-a]-pyridine
(L) 6-nitro-3[2-(5-nitrofuryl-2)-vinyl]-s-triazolo-[4.3-a]-pyridine
(M) 6-methyl-3[2-(5-nitrofuryl-2)-vinyl]-s-triazolo-[4.3-a]-pyridine
(N) 7-methyl-3[2-(5-nitrofuryl-2)-vinyl]-s-triazolo-[4.3-a]-pyridine
(O) 5-methyl-3[2-(5-nitrofuryl-2)-vinyl]-s-triazolo-[4.3-a]-pyridine
(P) 3-methyl-5-[2-(5-nitrofuryl-2)-vinyl]-s-triazolo-[4.3-a]-pyridine
(Q) 3-methyl-7-[2-(5-nitrofuryl-2)-vinyl]-s-triazolo-[4.3-a]-pyridine
(R) 3-ethyl-7-[2-(5-nitrofuryl-2)-vinyl]-s-triazolo-[4.3-a]-pyridine
(S) Furacin - nitrofurazone, 5-nitro-2-furaldehydesemicarbazone
(T) Furoxon-furazolidone, 3-(5-nitrofurfurylideneamino)-2-oxazolidinone
(U) Furadantin-nitrofurantoin, N-(5-nitro-2-furfurylidene)-1-aminohydantoin The compounds S, T and U were employed as comparison compounds. The absolute bacteriostatic minimal concentration in μg./ml. was determined for the compounds in accordance with the invention as well as for the comparison compounds. The results are set out in the following table.

TABLE.—BACTERIOSTATIC ACTIVITY IN VITRO

Absolute bacteriostatic minimal concentration in μg./ml.

| Organism | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| *Staphylococcus aureus* SG 511 (12) | 2 | 4 | 4 | 1 | 1 | 4 | 2 | 1 | 4 | 0.5 | 0.125 | 2 | 0.25 | 0.125 | 0.5 | 0.062 | 0.125 | 0.25 | 8 | 1 | 4 |
| *Streptococcus pyogenes* Aronson (75) | 64 | 8 | 64 | 32 | 2 | 0.25 | 0.5 | 0.25 | 0.25 | 0.5 | 0.062 | 4 | 0.062 | 0.016 | 1 | 0.062 | 0.125 | 0.125 | 4 | 8 | 4 |
| *Streptococcus faecalis* (155) | 0.125 | 0.25 | 2 | 0.062 | 0.125 | 1 | 0.125 | 0.062 | 0.125 | 0.031 | 0.008 | 0.25 | 0.016 | 0.031 | 0.021 | — | 0.016 | 0.062 | 16 | 4 | 1 |
| *Escherichia coli* (18) | 0.125 | 0.125 | 0.5 | 0.062 | 0.125 | 0.25 | 0.125 | 0.125 | 0.125 | 0.062 | 0.031 | 0.125 | 0.062 | 0.031 | 0.062 | 0.031 | 0.031 | 0.062 | 4 | 0.25 | 1 |
| *Proteus mirabilis* (298) | 4 | 2 | 32 | 16 | 32 | 8 | 8 | 8 | 32 | 8 | 1 | >16 | 8 | 2 | 8 | 2 | 2 | 4 | 64 | 32 | 128 |
| *Pseudomonas aeruginosa* (71) | 8 | 2 | 32 | 32 | >128 | 32 | 32 | 64 | >128 | >16 | 1 | >16 | 32 | 4 | 64 | 8 | 4 | 8 | >64 | 64 | 128 |

The bacteriostatic activity of the compounds of the invention, following oral administration in rats was further evaluated according to the following:

BACTERIOSTATIC ACTIVITY OF THE URINE OF RATS FOLLOWING ORAL ADMINISTRATION

Bacteriostatic maximum dilution of urine against *Escherichia coli* (106) was determined using 50 ml. urine samples 22 hours after 20 mg. test compound per kg. body weight had been orally administered. 6 rats were employed for each experiment and every value recorded in the table represents the results thereby obtained

| H | K | Q | U |
| --- | --- | --- | --- |
| 1:180 | 1:21 | 1:56 | 1:54 |
| 1:136 | 1:45 | 1:50 | 1:30 |
|  | 1:13 |  | 1:41 |
|  | 1:27 |  | 1:19 |
|  |  |  | 1:40 |
|  |  |  | 1:21 |

One of the aspects of the invention is to provide compositions containing 5-nitrofuryl-2-s-triazolo-[4.3-a]-pyridine derivatives in accordance with the invention for use in combating bacterial-induced disease or conditions. According to the invention, the novel 5-nitrofuryl-2-s-triazolo-[4.3-a]-pyridine derivatives may be associated with a carrier which may be either a solid material or a sterile parenteral liquid. The compositions may take the forms of tablets, powders, capsules, or other dosage forms, which are particularly useful for oral ingestion. Liquid diluents are employed in sterile condition for parenteral use, that is, by injection. Such a medium may be a sterile solvent, such as water; the compositions may take the form of the active material, namely, the 5-nitrofuryl-2-s-triazolo - [4.3-a] - pyridine derivatives, admixed with solid diluents and/or tableting adjuvants, such as corn starch, lactose, talc, stearate talc, magnesium stearate, gums or the like. Any of the tableting materials used in pharmaceutical practice may be employed where there is no incompatibility with the 5-nitrofuryl-2-s-triazolo-[4.3-a]-pyridine derivatives constituting the active agent. The material may be tableted with or without adjuvants. Alternatively, the 5 - nitrofuryl-2-s-triazolo-[4.3-a]-pyridine derivatives of the invention, with its adjuvant material, may be placed in the usual capsule or resorbable material, such as the usual gelatin capsule and administered in that form. In yet another embodiment, the novel 5 - nitrofuryl-2-s-triazolo-[4.3-a]-pyridine derivatives may be put up into powder packets and employed in that fashion, or the composition may be prepared in the form of a suspension material in which the 5-nitrofuryl-2-s-triazolo-[4.3-a]-pyridine derivatives are not soluble.

The percentage of active ingredients in the compositions may be varied. It is necessary that the active ingredient constitute a portion such that a suitable dosage will be obtained. Obviously, several unit dosage forms may be administered at about the same time.

A preferred dosage unit is a tablet containing 10 to 100 mg. of active compound which may be administered three times a day. Depending upon the condition, symptomatic and laboratory responses 10 to 400 mg. per day can be administered. Another preferred form for orally administering the compounds of the invention is in the form of a suspension in a water-miscible flavored gel. Such gel can contain from 1 to 10 mg. compound per cc.

What is claimed is:
1. A compound having the formula:

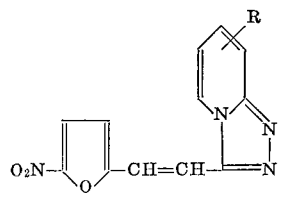

wherein R is a member selected from the group consisting of hydrogen, halogen, lower alkyl, lower alkoxy, nitro, amino, lower acetylamino, carboxyl methoxycarbonyl and carboxamido.

2. A compound according to claim 1 designated 3-[2-(5-nitrofuryl-2)-vinyl]-s-triazolo[4.3-a]-pyridine.

3. A compound according to claim 1 designated 8-methyl-3-[2-(5-nitrofuryl-2)-vinyl]-s - triazolo[4.3 - a]-pyridine.

4. A compound according to claim 1 designated 6-nitro-3-[2-(5-nitrofuryl-2)-vinyl]-s-triazolo[4.3-a]-pyridine.

5. A compound according to claim 1 designated 6-methyl-3-[2-(5-nitrofuryl-2)-vinyl]-s - triazolo[4.3 - a]-pyridine.

6. A compound according to claim 1 designated 7-methyl-3-[2-(5-nitrofuryl-2)-vinyl]-s - triazolo[4.3 - a]-pyridine.

7. A compound according to claim 1 designated 5-methyl-3-[2-(5-nitrofuryl-2)-vinyl]-s - triazolo[4.3 - a]-pyridine.

8. A compound having the formula:

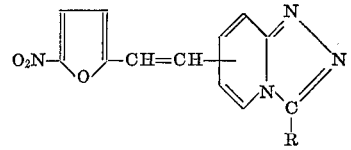

wherein R is a member selected from the group consisting of hydrogen, lower alkyl, amino, acetylamino, hydroxymethyl, acetoxy methyl and methoxy methyl.

9. A compound according to claim 8 designated 3-methyl-5-[2-(5-nitrofuryl-2)-vinyl]-s - triazolo[4.3 - a]-pyridine.

10. A compound according to claim 8 designated 3-methyl - 7 - [2 - (5-nitrofuryl-2)-vinyl]-s-triazolo[4.3-a]-pyridine.

11. A compound according to claim 8 designated 3-ethyl-7-[2-(5-nitrofuryl-2)-vinyl] - s - triazolo[4.3 - a]-pyridine.

References Cited

UNITED STATES PATENTS 2,917,511   12/1959   Bicking _____ 260—240

OTHER REFERENCES

Naqui et al., J. Sci. Industr. Res., vol. 21B, pp. 456 to 457 (1962).

Miura et al., Progress in Medicinal Chemistry, vol. 5, chapter 6, pp. 320 to 322, 333 and 335 (copyrighted 1967).

The Nitrofurans, vol. 1, pp. 10 and 17, Eaton Laboratories, Norwich, New York (1958).

Koschucharoff et al., Parmazie, vol. 15, pp. 492–7 (1960).

Takahashi et al., Chemical Abstracts vol. 44, cols. 5372 to 5373 (1950).

JOHN D. RANDOLPH, Primary Examiner

U.S. Cl. X.R.

424—263; 260—295, 295.5, 296